United States Patent [19]

Beckershoff

[11] 4,068,958
[45] Jan. 17, 1978

[54] DIFFERENTIALLY BOLTED JOINT

[75] Inventor: Wolfgang Beckershoff, Aarau, Switzerland

[73] Assignee: BBC, Brown, Boveri & Company Limited, Baden, Switzerland

[21] Appl. No.: 763,320

[22] Filed: Jan. 28, 1977

[30] Foreign Application Priority Data

Apr. 6, 1976 Switzerland .................. 4281/76

[51] Int. Cl.² ............................................. F16B 5/02
[52] U.S. Cl. ...................................... 403/8; 403/384;
52/127; 52/584; 403/47
[58] Field of Search ................... 403/6, 8, 47, 48, 46,
403/118, 320, 384, 388; 52/127, 584

[56] References Cited

U.S. PATENT DOCUMENTS

| 1,464,337 | 8/1923 | Price et al. | 403/47 |
| 2,051,899 | 8/1936 | Rose | 403/320 X |
| 3,369,334 | 2/1968 | Berg | 52/584 X |
| 3,837,759 | 9/1974 | Bittern | 403/118 X |
| 3,876,316 | 4/1975 | Sandevist | 403/46 X |
| 3,995,962 | 12/1976 | Mylaeus | 403/47 |

FOREIGN PATENT DOCUMENTS 1,417,983  12/1975  United Kingdom .................. 403/46

Primary Examiner—Wayne L. Shedd
Attorney, Agent, or Firm—Pierce, Scheffler & Parker

[57] ABSTRACT

A differentially threaded bolting arrangement for bolting two machine parts together includes one or more bolts the opposite ends of which are provided with threaded sections differing in pitch, a threaded hole in one of the machine parts into which the bolt end with the greater pitch is threaded, a bore through which the bolt passes and an adjacent hollow area in the other machine part in alignment with the threaded hole, and a nut having a cylindric configuration located in the hollow area and which is movable axially but is restrained against rotation. The bolt end having the smaller pitch is threaded through the nut and as the bolt is rotated, the nut is thus caused to move axially into a forced contact with the lower end of the hollow area accompanied by a drawing together of the two machine parts. When several bolts are utilized, all of the bores and hollow areas with the nuts therein can be located in one of the machine parts and all of the threaded holes can be located in the other machine part, or the bores, hollow areas, and nut assemblies and the threaded holes can be located alternately in the machine parts.

11 Claims, 6 Drawing Figures

DIFFERENTIALLY BOLTED JOINT

BACKGROUND OF THE INVENTION

This invention concerns an improved arrangement differentially bolting together at least two machine parts by means of at least one threaded bolt which possesses at its two ends threads that differ from each other in pitch.

Machine parts are normally bolted together by means of hexagonal or cylindric head screws with or without nuts, or by means of threaded bolts with nuts. If split housings and other containers are bolted together, the bolts are usually accommodated in juxtaposed flanges which protrude beyond the container wall. If the machine parts to be bolted together require a powerful compression, a bolting by differential threads is used, for example, in the case of the so-called Hirth tooth system for crankshafts (see Dubbel: "Tashchenbuch fuer den Maschinenbau," Volume I, page 801, Fig. 198, 13th Edition, 1970), where each of the two parts to be connected under tension possesses a bore with an internal thread but where one of the two parts has a smaller screw pitch than the other. The associated threaded bolt does not have a head but possesses likewise two thread sections of different pitch. This bolt is first screwed into the part having a small screw pitch, then the second part is then placed onto the bolt end with the greater screw pitch and the threaded bolt is then screwed into it. The bolt will enter the part with the greater screw pitch at a faster rate than its rate of emerging from the part having the smaller screw pitch, with the result that the two parts will approach each other by the difference in pitch per one turn of the bolt. When the two parts are finally tightened, the transmission ratio is very high due to the effective small pitch.

These known types of threaded connections have the following disadvantages:

The use of screw bolts equipped with heads make it necessary to provide the machine parts which are to be bolted with flanges that protrude beyond the contours of these parts. If the parts are subjected to high operating temperatures and strong pressures and have large diameters, such flanges will assume dimensions that lead to localized concentrations of material, and become a potential source of wide differences in temperature when the machine is started, thereby causing inadmissible stresses and deformations.

The known arrangement of differential thread connection is applicable only for a construction where one single differentially threaded bolt is used because each turn of the bolt causes the two machine parts to move closer to each other, and if two or more bolts were to be used it would become necessary to tighten all these bolts simultaneously.

SUMMARY OF THE INVENTION

It is the principal object of the invention to establish an arrangement of the above described type for the bolting together of machine parts which does not require the use of flanges that protrude beyond the surfaces of the machine parts, which offers the advantages of differential threading while permitting the concurrent use of several bolting elements arranged in close proximity to each other, and where it becomes feasible to join the machine parts together in a flush manner even prior to the bolting action.

An arrangement solving this problem is characterized by the features that, when the arrangement is in its bolted state, the first end of the threaded bolt, possessing the greater pitch, is screwed into a threaded hole located within a first machine part, that the threaded bolt extends through a throughbore of a second machine part, said throughbore being aligned with the threaded hole, that the second end of the bolt, possessing the smaller pitch, is screwed into a nut which rests at the end face of a hollow area that forms an extension of the throughbore, making the threaded bolt accessible, and that the nut is movable in axial direction of the threaded bolt by the turning of said bolt while being guided and secured against turning about its axis by suitably formed lateral surfaces on the hollow area.

The arrangement described above has several advantages. There is no need for a simultaneous tightening of all threaded bolts even though use is made of differentially threaded bolts. The spacing between the individual bolts can be reduced substantially because they require less room than equivalent hexagonal bolts. When the machine parts are separated, loose components, such as nuts, bolts and washers, cannot get lost or drop into the machine because the threaded bolts and nuts are held in place within their respective throughbores and are thus secure. This specific coupling is particularly suitable for small split rings which are to be machined all-around, for example, by means of a lathe, while in the bolted state because the bolting parts are located within the width of the walls and will therefore not impede the machining operation.

A preferred species of the arrangement results in a very small stress-concentration-factor in the proximity of the bottom of the nut's guide, which forms the half-round bearing surface upon which the cylindrical nut rests, both matching parts having the same radius. In this manner there is also attained the greatest feasible transitional radius relating to the webs of material, existing between the boltings, within the machine parts to be connected. This arrangement leads to the further advantage of a simple and precise manufacture of the nut's guide by drilling and milling.

BRIEF DESCRIPTION OF THE DRAWINGS

Species of the invention will be explained below by use of the accompanying drawings, wherein.

In these figures identical parts are denoted by identical reference numerals.

DETAILED DESCRIPTION OF PREFERRED EMBODIMENTS

Figures 1, 2:
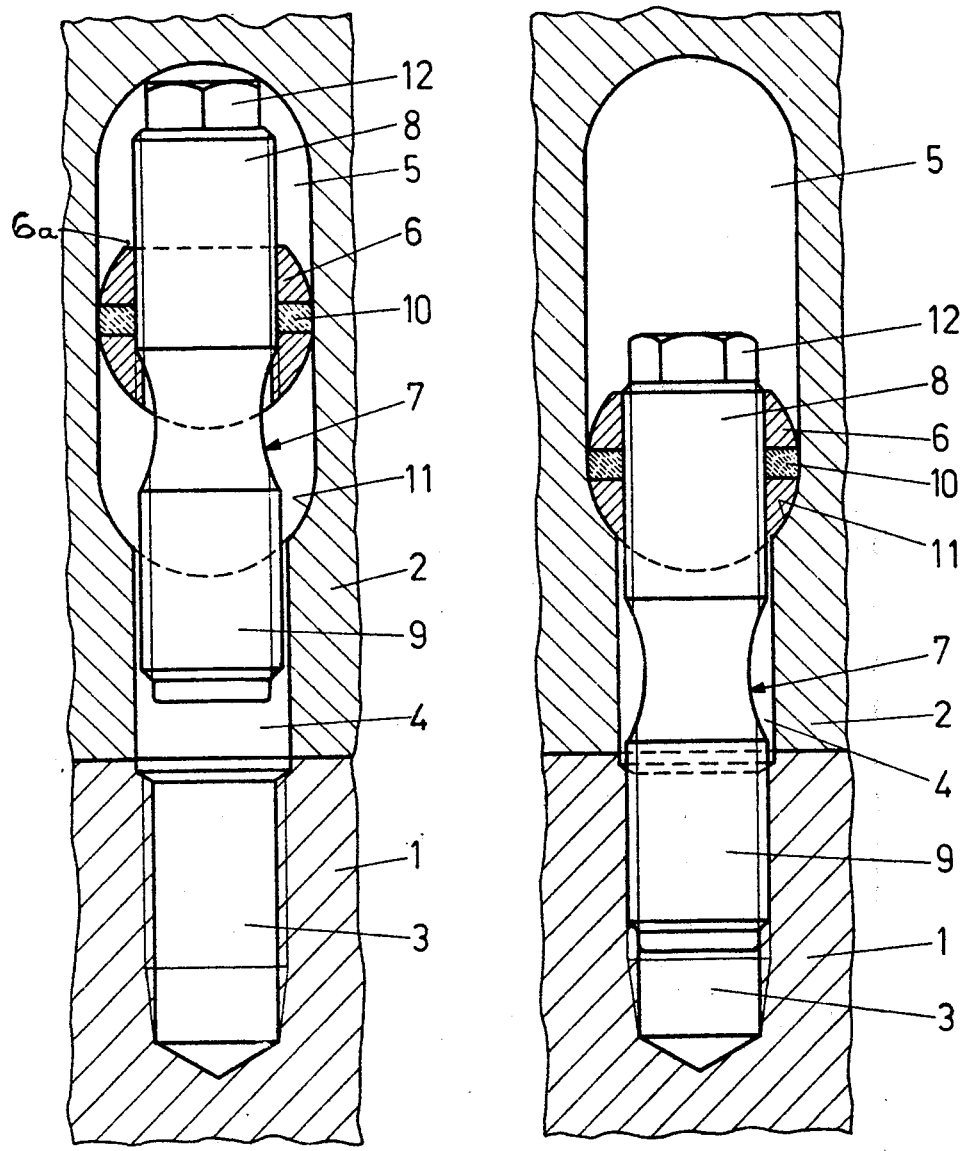
FIG. 1 depicts an arrangement for a differentially bolting together of two superposed machine parts, in the unbolted state.
FIG. 2 shows the arrangement depicted by FIG. 1 in the bolted state.

The arrangement depicted in FIG. 1 comprises a first machine part 1 with a threaded hole 3, a second machine part 2 with a throughbore 4 which is aligned with the threaded hole 3, and a hollow area 5 forming an extension of the throughbore 4. This hollow area 5, allowing access to, and thus making possible the turning of the threaded bolt 7, can be formed by an opening of the wall of part 2 or by a blind window-opening, prepared, for example, by an end-milling cutter. The hollow area 5 serves additionally as a guide for a nut 6, shaped in the form of a cylinder, its axis running vertically to the drawing plane, its top 6a being flattened. The first end 8 of the threaded bolt 7, possessing a smaller pitch, is screwed through the nut 6, while its second end 9, possessing a thread of greater pitch, can be screwed into the threaded hole 3 of the part 1.

Figure 3:
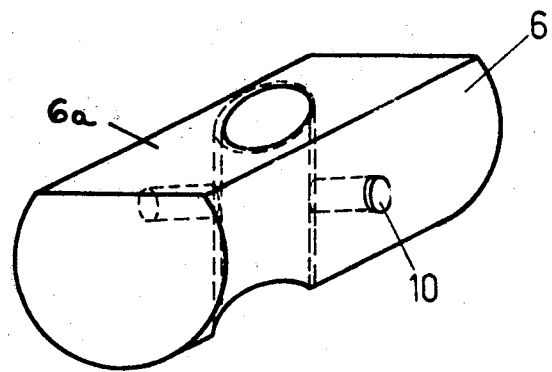
FIG. 3 gives a perspective view of the nut shown by FIGS. 1 and 2.
Figure 4:
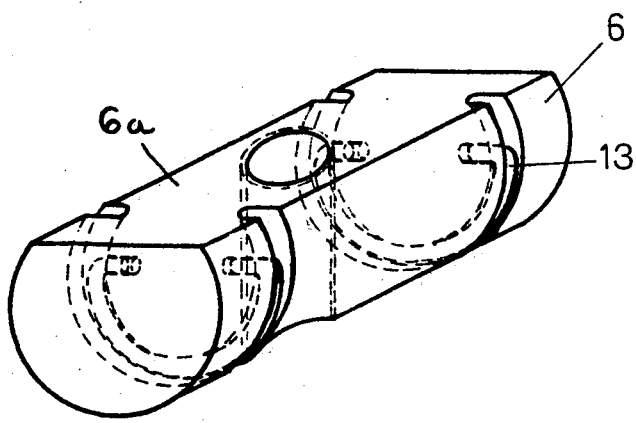
FIG. 4 shows another species of the nut.

The nut 6, illustrated in a perspective view by FIG. 3, is guided by the lateral areas of the hollow area 5 and can move in axial direction of the threaded bolt 7 but is prevented from turning. Two pins 10, placed in radial bores of the nut 6 and made of a material possessing a great coefficient of friction, for example, Perlon, serve as friction elements, increasing the friction between the nut 6 and the lateral surfaces of the hollow area 5. These pins 10 penetrate up to the thread of the bolt 7 and thus serve simultaneously as safety elements by preventing a loosening of the bolting. If high operating temperatures are involved, the friction elements can consist of material with high temperature characteristics and where, as shown in FIG. 4, two semi-circular steel clips 13 in the form of spring elements are arranged in such manner that the threaded bolt can be entered without hindrance.

For bolting parts 1 and 2 together, nut 6 is first placed into the hollow area 5, the threaded bolt 7, while crossing the pass-through bore 4, is screwed into the nut 6, and these two components are shifted within the hollow area 5 until they reach the position shown in FIG. 1. Parts 1 and 2 are then superposed as illustrated in FIG. 1. The threaded bolt 7 with the nut 6 is moved toward part 1 and the second end 9 of the bolt is screwed into the threaded hole 3. The bolt end 8 will move, through its thread, gradually away from the nut 6 during this operation. Due to the specific pitch ratios provided, the threaded bolt 7 will enter the threaded hole 3 faster than it emerges from the nut 6, with the result that the nut 6 will approach the bearing surface 11 at the root of its guidance within the hollow area 5 at the rate of the difference in pitch. The position of the nut 6 at the threaded bolt 7 when first engaging the threaded hole 3 as well as the dimensions of the threaded bolt 7 are established in such manner that at the moment of contact between rounded surface of nut 6 and the rounded bearing surface 11, the threaded end 9 is screwed fully into the threaded hole 3 and the nut 6 is filled in its entire height by the threaded end 8 of the bolt 7, while the part 12 which serves for the turning of the threaded bolt 7 and which can be an hexagonal or a square head, or a cylindric head with internal hxagonal opening, protrudes at a proper and sufficient length beyond the upper surface of the nut. If the threaded bolt 7 is now turned any further, the machine parts 1 and 2 will be forced together, with the relative positions of the various components corresponding to the positions depicted by FIG. 2. It should be mentioned here that this arrangement is also very suitable for the bolting together or more than two parts, namely, by placing the machine parts 1 and 2 at the outer sides and by providing the intermediary parts merely with pass-through apertures for the threaded bolts 7.

Figure 5:
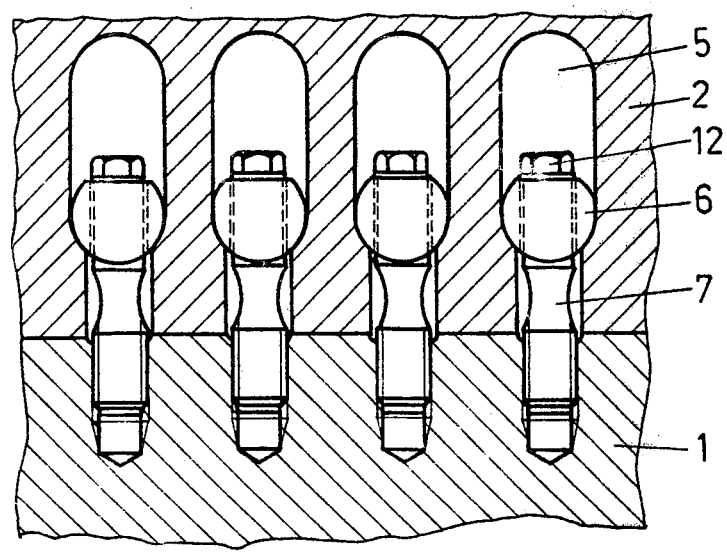
FIG. 5 depicts an arrangement with several bolting connections.
Figure 6:
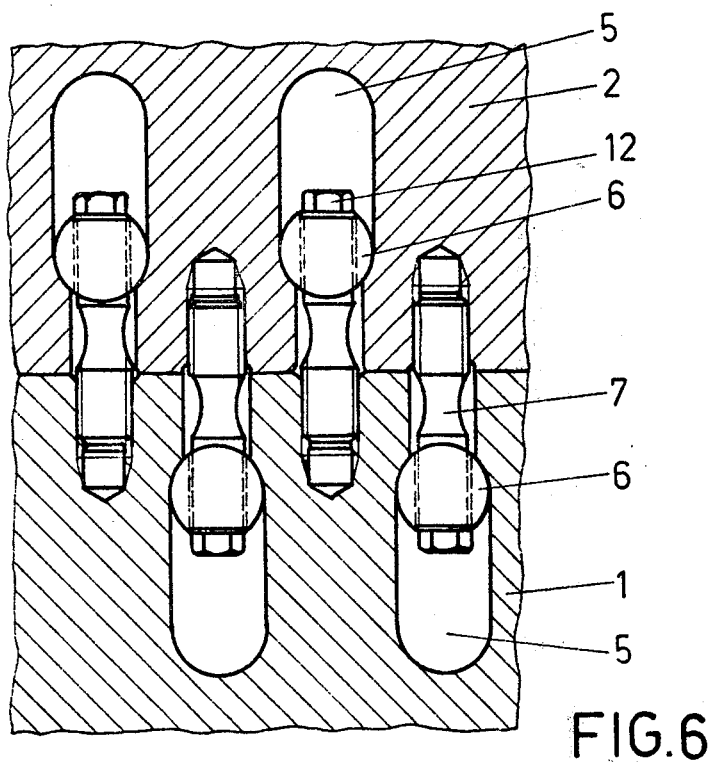
FIG. 6 shows another species of an arrangement with several bolting connections.

One of the most important advantages of the arrangement proposed by the invention is demonstrated by FIGS. 5 and 6, namely, that the spacing between the individual threaded bolts 7 can be made substantially smaller than heretofore since these bolts require less room than equivalent hexagonal bolts. In FIG. 5 all hollow areas 5 are placed within part 2, and all threaded holes 3 in the part 1. The arrangement shown by FIG. 6 results in an additional saving of space by arranging the hollow areas 5 and the threaded holes 3 alternately within the parts 1 and 2. The rounded-off shape of the bearing surface 11 serves to reduce the stress-raising effect in the material between two adjacent hollow areas to a minimum.

I claim:

1. A differentially threaded bolting arrangement for securing two machine parts together comprising at least one threaded bolt, the opposite end portions of said bolt being provided respectively with threads differing in pitch, a threaded hole in a first one of said machine parts into which the end of said bolt having the greater pitch is threadable, a throughbore provided in a second one of said machine parts in alignment with the threaded hole in said first machine part and a hollow area forming an extension of said throughbore, said hollow area being accessible for effecting rotation of said bolt, a nut disposed in said hollow area, said nut being movable axially into contact with an end face of said hollow area but restrained against rotation about its axis by engagement with lateral faces of said hollow area, and the opposite end of said bolt having the smaller pitch being threadable into said nut whereby said nut is moved axially upon rotation of said bolt into contact with said end face of said hollow area accompanied by a drawing together of said first and second machine parts.

2. A differentially threaded bolting arrangement as defined in claim 1 and which further includes friction means carried by said nut and which engage a lateral face of said hollow area for increasing the friction therebetween.

3. A differentially threaded bolting arrangement as defined in claim 2 wherein said friction means also engage the surface of said bolt to inhibit the bolt from working loose.

4. A differentially threaded bolting arrangement as defined in claim 3 wherein said friction means comprises at least one pin of friction material which extends through the wall of said nut to engage the bolt surface and also a lateral face of said hollow area.

5. A differentially threaded bolting arrangement as defined in claim 4 wherein said friction pin is made of Perlon.

6. A differentially threaded bolting arrangement as defined in claim 2 wherein said friction means comprises a semi-circular metallic clip.

7. A differentially threaded bolting arrangement as defined in claim 1 wherein said nut has a cylindric configuration the axis of which extends normal to the axis of said bolt and wherein the lower rounded surface of said nut contacts a complementary rounded end face of said hollow area.

8. A differentially threaded bolting arrangement as defined in claim 7 and which further includes a pair of semi-circular clips mounted in complementary recesses in the surface of said cylindric nut, said clips being located to opposite sides of the threaded opening through the nut and which engage the lateral faces of said hollow area for increasing the friction between said nut and lateral faces.

9. A differentially threaded bolting arrangement as defined in claim 7 and which further includes a pair of aligned pins of friction material extending through the wall of said nut to engage opposite sides of said bolt and to also engage the lateral walls of said hollow area thereby to respectively inhibit loosenings of said bolt and increase the friction between said nut and the lateral walls of said hollow area.

10. A differentially threaded bolting arrangement for securing two machine parts together comprising a plurality of differentially threaded bolts and related components each as defined in claim 1 wherein all of said hollow areas with the nuts therein are located in one of said machine parts and all of the threaded holes are located in the other machine part.

11. A differentially threaded bolting arrangement for securing two machine parts together comprising a plurality of differentially threaded bolts and related components each as defined in claim 1 wherein said hollow areas with the nuts therein and said threaded holes are located alternately in said machine parts.

* * * * *